(12) United States Patent
Hong et al.

(10) Patent No.: US 12,732,696 B2
(45) **Date of Patent: *Sep. 8, 2026**

(54) MICROVIDEO SYSTEM, FORMAT, AND METHOD OF GENERATION

(71) Applicant: Google LLC, Mountain View, CA (US)

(72) Inventors: Wei Hong, Sunnyvale, CA (US); Radford Ray Juang, Fremont, CA (US); Marius Renn, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/814,119

(22) Filed: Aug. 23, 2024

(65) Prior Publication Data

US 2024/0422435 A1 Dec. 19, 2024

Related U.S. Application Data

(63) Continuation of application No. 18/175,152, filed on Feb. 27, 2023, now Pat. No. 12,143,720, which is a (Continued)

(51) Int. Cl.
*H04N 23/68* (2023.01)
*G11B 27/031* (2006.01)
(Continued)

(52) U.S. Cl.
CPC ....... *H04N 23/6811* (2023.01); *H04N 23/667* (2023.01); *H04N 23/69* (2023.01); *H04N 23/73* (2023.01)

(58) Field of Classification Search
CPC .. H04N 23/6811; H04N 23/667; H04N 23/69; H04N 23/73; H04N 1/212;
(Continued)

(56) References Cited

U.S. PATENT DOCUMENTS 7,986,334 B2 7/2011 Bannai et al.
8,885,952 B1 11/2014 Filip et al.
(Continued)

FOREIGN PATENT DOCUMENTS

CN 103620682 3/2014
CN 104113698 10/2014
(Continued)

OTHER PUBLICATIONS

Burgett, "Google's Photo App Motion Stills is Now Available for Android", Sep. 20, 2018, http://www.digitaltrends.com/photography/google-motion-stills-live-photos-app-apple-stabilization-, retrieved Oct. 11, 2018, 12 pages.
(Continued)

*Primary Examiner* — Marly S Camargo
(74) *Attorney, Agent, or Firm* — DORITY & MANNING P.A.

(57) ABSTRACT

An image capture device includes an image sensor configured to capture raw image data, an image signal processor configured to process the raw image data to form a plurality of image frames, and one or more processors to implement a microvideo generation system. The microvideo generation system is configured to perform a trimming operation relating to the plurality of image frames according to one or more image criteria, and generate, based on the trimming operation, a microvideo including a still image and a video in a same data file.

20 Claims, 6 Drawing Sheets

Related U.S. Application Data continuation of application No. 17/751,274, filed on May 23, 2022, now Pat. No. 11,595,580, which is a continuation of application No. 16/624,952, filed as application No. PCT/US2018/041748 on Jul. 12, 2018, now Pat. No. 11,343,429.

(60) Provisional application No. 62/567,373, filed on Oct. 3, 2017.

(51) Int. Cl.
*H04N 23/667* (2023.01)
*H04N 23/69* (2023.01)
*H04N 23/73* (2023.01)

(58) Field of Classification Search
CPC ........... H04N 1/32128; H04N 23/6812; H04N 23/6815; H04N 23/682; G11B 27/031
See application file for complete search history.

(56) References Cited

U.S. PATENT DOCUMENTS 9,407,823 B2 8/2016 Khoury
9,471,993 B2 10/2016 Curcio et al.
9,483,350 B1 11/2016 Camp et al.
10,417,828 B2 9/2019 Kamhi et al.
10,664,687 B2 5/2020 Suri et al.
10,741,213 B1 * 8/2020 Selby .................. G11B 27/031
11,138,798 B2 10/2021 Paul et al.
11,343,420 B1 5/2022 Herz et al.
11,343,429 B2 * 5/2022 Hong ................. H04N 23/6811
11,595,580 B2 2/2023 Hong et al.
2004/0252193 A1 12/2004 Higgins
2011/0102616 A1 5/2011 Migiyama et al.
2011/0264715 A1 10/2011 Singer et al.
2014/0232911 A1 8/2014 Takaiwa
2014/0359447 A1 12/2014 Kannan et al.
2015/0078727 A1 3/2015 Ross et al.
2015/0082168 A1 3/2015 Brieussel
2015/0163407 A1 6/2015 Khoury
2015/0179318 A1 6/2015 Fujikawa et al.
2015/0363651 A1 12/2015 Zhao et al.
2016/0180590 A1 6/2016 Kamhi et al.
2017/0244897 A1 8/2017 Jung et al.
2018/0163407 A1 6/2018 Daugherty
2022/0107800 A1 4/2022 Lyske et al.
2022/0201241 A1 * 6/2022 Oules ................. H04N 21/8456

FOREIGN PATENT DOCUMENTS

CN 105830429 6/2019
EP 2887641 6/2015
WO WO 2015/191650 12/2015
WO WO 2016/174524 11/2016
WO WO 2016/191096 12/2016

OTHER PUBLICATIONS

Cipriani, "iOS 11 Livens up Live Photos with Some New Tricks", Sep. 14, 2017, http://www.cnet.com/how-to/check-out-ios-11s-new-live-photos-tricks, retrieved Oct. 11, 2018, 8 pages.
Conley et al., "Motion Stills—Create Beautiful GIFs from Live Photos", Jun. 7, 2016, Google AI Blog, retrieved Oct. 11, 2018, 8 pages.
Google AI Blog, "Motion Stills—Now on Android", Jul. 20, 2017, https://ai.googleblog.com/2017/07/motion-stills-now-on-android.html, retrieved on May 21, 2021, 3 pages.
Horaczek, "Your Photos Just Had a Massive Change with iOS 11. Here's What Happened", Sep. 21, 2017, https://www.popsci.com/HEIF-iphone-photos-ios-11, retrieved on Oct. 11, 2018, 4 pages.
International Preliminary Report on Patentability for Application No. PCT/US2018/041748, mailed Apr. 16, 2020, 9 pages.
International Search Report for PCT/US2018/041748 mailed on Sep. 28, 2018, 6 pages.
Extended European Search Report for Application No. EP 25182225.0, mailed Sep. 15, 2025, 14 pages.
Chinese Search Report Corresponding to Application No. 2022113912202 on Feb. 26, 2026.
Machine Translated Chinese Search Report Corresponding to Application No. 2022113912202 on Jul. 7, 2026.

* cited by examiner

Ring Buffer
M Seconds
N Seconds
Starting Frame
F_shutter
Ending Frame

T_motion
T_large
T_small
V1
V2
V

MICROVIDEO SYSTEM, FORMAT, AND METHOD OF GENERATION

PRIORITY CLAIM

This application is a continuation of U.S. application Ser. No. 18/175,152 having a filing date of Feb. 27, 2023, which is a continuation of U.S. application Ser. No. 17/751,274 having a filing date of May 23, 2022, which is a continuation of U.S. application Ser. No. 16/624,952 having a filing date of Dec. 20, 2019, which is based upon and claims the right of priority under 35 U.S.C. § 371 to International Application No. PCT/US2018/041748 filed on Jul. 12, 2018, which claims the benefit of U.S. Provisional Application Ser. No. 62/567,373 filed on Oct. 3, 2017. Applicant claims priority to and the benefit of each of such applications and incorporates all such applications herein by reference in their entirety for all purposes.

FIELD

The present disclosure relates generally to the capture and representation (e.g., playback) of imagery, including videos. More particularly, the present disclosure relates to systems and methods that use and/or generate image files according to a novel microvideo image format and, further, a technique for trimming microvideos.

BACKGROUND

An image capture device is a device that can capture imagery (e.g., in the form of image frames). Image capture devices include cameras, recorders, sensors, and/or other devices. In some instances, image capture devices can have a primary purpose other than capturing imagery. For example, image capture devices can include devices that are "camera-enabled" or have an image capture system embedded within the device such as, for example, certain smartphones, laptops, smart appliances, smart speakers, home manager devices, security systems, and the like. In some instances, image capture devices can be mobile image capture devices that are capable of being moved and/or image capture devices that are capable of being worn. Furthermore, computing systems that do not explicitly capture imagery themselves can still be used to view, edit, or display imagery captured by an image capture device.

Certain existing image capture devices can include a feature that enables the device to capture a short moving image (i.e., "movie") when a user operates the device to capture imagery. In particular, the short movie can include imagery captured a predetermined amount of time (e.g., 1.5 seconds) both before and after a user operates the device to capture imagery (e.g., by selecting a physical or virtual button to instruct the device to capture imagery). However, this short movie often includes extraneous imagery that reduces the quality of the moving image. For example, the movie might include imagery that corresponds to out-of-pocket motion (e.g., captured while the user removes the device from her pocket), sudden brightness change, and/or undesired camera zooming and rotation.

Another challenge faced by the design and use of certain forms of image capture devices (e.g., mobile image capture devices and/or image capture devices that are able to be worn) is the resource-limited environment in which they operate. In particular, the design and use of image capture devices is commonly subject to the following constraints: a limited amount of memory to be used for image storage over a significant period of time; a limited amount of processing power or capability to continuously process imagery; a limited amount of energy available to operate over an extended period of time; and/or a limited amount of thermal power that can be dissipated (i.e., a device temperature that should not be exceeded so as to prevent overheating of the device or discomfort for the user, who may in some instances wear the mobile image capture device).

SUMMARY

Aspects and advantages of embodiments of the present disclosure will be set forth in part in the following description, or can be learned from the description, or can be learned through practice of the embodiments.

Example aspects of the present disclosure are directed to systems and methods that use and/or generate image files according to a novel microvideo image format. For example, a microvideo can be a file that contains both a still image and a brief video. The microvideo can include multiple tracks, such as, for example, a separate video track, audio track, and/or one or more metadata tracks. As one example track, the microvideo can include a motion data track that stores motion data that can be used (e.g., at file runtime) to stabilize the video frames. A microvideo generation system included in an image capture device can determine a trimming of the video on-the-fly as the image capture device captures the microvideo.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
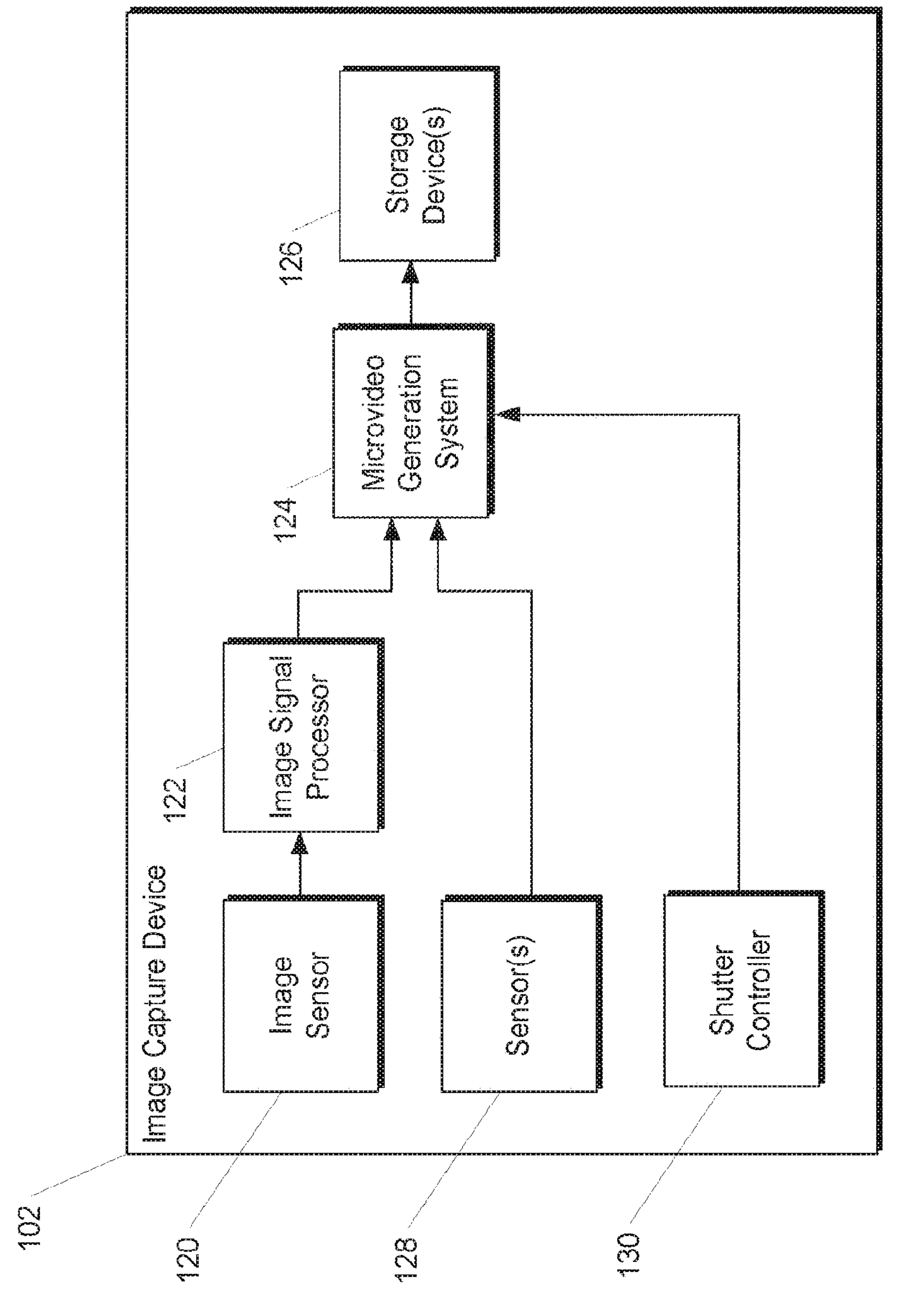
FIG. 1 depicts a block diagram of an example image capture device according to example embodiments of the present disclosure.

Generally, the present disclosure is directed to systems and methods that use and/or generate image files according to a novel microvideo image format. For example, a microvideo can be a file that contains both a still image and a brief video. An image capture device can include a microvideo generation system that generates microvideo files according to the microvideo image format. Likewise, computing systems of various kinds-including those that do not themselves capture imagery—can include one or more image viewers which can open or otherwise access the microvideo file to display the microvideo to a user.

Thus, according to one aspect, the present disclosure provides a novel microvideo image file format that enables a single microvideo file to contain both a still image and a brief video. For example, the video information can be concatenated with or otherwise appended to the still image information. In some implementations, the video portion can be included within a container (e.g., JPEG container) associated with the still image portion.

The microvideo file can be opened or otherwise accessible by viewers that support either the still image format or the video format. As such, the microvideo format can enable a user to view either the still image or the video (e.g., in a looping fashion). As one example, the still image can be a JPEG image and the video can be an MP4 format video. However, other formats can be used as well According to another aspect, the microvideo can include multiple tracks, such as, for example, a separate video track, audio track, and/or one or more metadata tracks. As one example track, the microvideo can include a motion data track that stores motion data that can be used (e.g., at file runtime) to stabilize the video frames. For example, the motion data track can store one or more homography matrices (e.g., one or more matrices per frame) that can be used to stabilize the video.

In some implementations, each homography matrix can be calculated or otherwise derived (e.g., when the microvideo is generated) from motion data received from one or more sensors, an image sensor, and/or an image signal processor (ISP). For example, the one or more sensors can include one or more gyroscopes, accelerometers, inertial measurement units (IMUs), or other motion sensing sensors that provide sensor data indicative of motion of the image sensor and/or the image capture device as a whole. As another example source of the motion data, the image sensor and/or the ISP can provide statistics or other data about the imagery, including exposure information, brightness information, zoom information, focus information, optical image stabilization (OIS) lens position, or other data descriptive of the image frames.

According to another aspect of the present disclosure, a microvideo generation system included in an image capture device can determine a trimming of the video on-the-fly as the image capture device captures the microvideo. In particular, the microvideo generation system can determine an optimal starting frame and ending frame and improve the quality of the video. For example, by trimming the video, the system can remove imagery that corresponds to out-of-pocket motion (e.g., captured while the user removes the device from her pocket), sudden brightness change, undesired camera zooming and rotation, blurry images, and/or other undesirable imagery, thereby improving the quality of the video.

More particularly, in some implementations, the microvideo generation system can include a buffer that stores a rolling window of image frames and motion data captured by the device. In some implementations, upon receiving a user control input (e.g., a user activation of a "shutter" control), the microvideo generation system can begin searching for a starting frame within the image frames stored within the buffer. For example, the microvideo generation system can search backwards from a "shutter frame" that was captured at the time the user control input was received.

Alternatively or additionally, in some implementations, the microvideo generation system can operate to generate microvideos in an automatic fashion. For example, the shutter frame can be automatically selected at a time at which a particular triggering event occurs. For example, the appearance of a particular object (e.g., as detected by an object detector); a certain amount of motion within the scene; or other events might be detected by the image capture device and trigger the automatic generation of a microvideo.

In some implementations, the microvideo generation system can identify the starting frame by applying one or more criteria. As one example, the one or more criteria can include a motion criterion that determines whether a motion distance between current frame under examination and the shutter frame is greater than a motion threshold. For example, the motion threshold can be dynamically determined based on a motion speed of the image capture device, which enables the microvideo generation system to handle trimming of panning shots (e.g., panoramas) differently than static shots.

As another example, the one or more criteria can include a total sensitivity change criteria that determines whether a change in total sensitivity between the current frame and the shutter frame exceeds a sensitivity threshold. For example, the total sensitivity can be a function of sensor sensitivity and exposure time, which can be retrieved, for example, from the ISP. As yet another example, the one or more criteria can include a zoom criterion that determines whether a change in zoom is greater than a zoom threshold.

As another example, the one or more criteria can include a motion blur criterion that analyzes an amount of motion blur associated with the current frame. This motion blur criterion can be used to remove or otherwise start or end the microvideo at or adjacent to blurry frames that are caused by camera motion. As yet another example, the one or more criteria can include a focus criterion that analyzes auto focus data associated with the current frame. This focus criterion can be used to remove or otherwise start or end the microvideo at or adjacent blurry frames that are caused by the lens being out-of-focus.

In some implementations, the microvideo generation system can select the first frame that meets a certain number (e.g., one, two, all, etc.) of the one or more criteria (e.g., the three example criteria described above) as the starting frame. In some implementations, if none of the frames in the buffer meet the certain number of criteria, then the oldest frame within the buffer can be selected as the starting frame.

In some implementations, once the starting frame is determined, the microvideo generation system can instruct or operate an encoder to start encoding the microvideo from the starting frame. Before or after such encoding begins, the microvideo generation system can begin searching for the ending frame.

In some implementations, the microvideo generation system can analyze each new frame as it is captured or otherwise is available to the microvideo generation system for analysis to determine whether such frame should be designated as the ending frame. For example, to identify the ending frame, the microvideo generation system can apply the same or similar criteria process described above with respect to selection of the starting frame. The same criteria can be used or different criteria can be used. If the same criteria are used, the same or different thresholds can be used. In some implementations, if no new frame captured within a certain predetermined period of time (e.g., 1.5 seconds) after the time of the user control event meets the certain number of criteria, then the new frame that is the predetermined period of time after the shutter frame can be selected as the ending frame.

The encoder can encode the image frames until the ending frame is reached. Thus, the duration of the microvideo can be from the starting frame to the ending frame.

In some implementations, since users may not desire microvideos that are very short and jarring, the microvideo generation system can check the microvideo duration against a minimum duration threshold (e.g., 1 second). In some implementations, if the microvideo duration is less than the minimum duration threshold, then the system can cancel the microvideo. For example, the still photo can be stored but without the microvideo. In other implementations, the microvideo with the duration less than the minimum duration threshold can still be saved. In other implementations, additional frames can be added to the beginning and/or end of the microvideo until the minimum duration threshold is reached. In some implementations, the user can be provided with control over how the microvideo generation system handles microvideos with duration less than the minimum duration threshold.

In some implementations, the shutter frame can be used as the still photo for the microvideo. In other implementations, various algorithms can be used to identify the image frame that is the highest quality, most representative of the video as a whole, most desirable, and/or most unique from the video as the still photo for the microvideo.

In some implementations, the microvideo generation system can generate multiple microvideo files in parallel. For example, multiple parallel instances of the microvideo generation system can be implemented in response to a user that provides user control input in a fast, repeated manner such as collecting a burst of images. Since, in at least some implementations, the start and ending trimming decisions are based on characteristics of the shutter frame, then these multiple parallel instances of microvideo trimming and generation may result in microvideos of different duration, start frames, end frames, and, therefore, content.

The systems and method of the present disclosure provide a number of technical effects and benefits. For instance, the microvideo image format may allow only a single file to be stored, from which both the still image and the video can be viewed independently, whereas in conventional file formats two files may be required to achieve this. Less memory capacity may be required to store a single file, which allows viewing of both still image and video, compared with storing two separate files. It is noted that the still image may be viewed not as a thumbnail (or another compressed version of one of the video frames) but instead at the same, or a higher resolution, as the frames of video.

As another example, the microvideo format can enable storage of motion data in a separate track for later use in stabilizing the video (e.g., at runtime). This is in contrast to alternative techniques in which the motion data is used to stabilize the video at the time of initial processing and storage. This enables a reduction in overall processing requirements since many users do not view every single image/video they capture (or even a majority of images/videos they capture). Thus, for each microvideo that the user does not ultimately view, the cost of performing the stabilization technique is avoided.

Another example technical effect and benefit derived from the separate motion data track is particularly applicable to image capture devices that have resource constrained operating environments. For example, a user may use the image capture device to capture the microvideo, but typically view the microvideo on a different device that has fewer resource constraints. In such scenario, the resource requirements to perform the stabilization process on the microvideo can be shifted from the image capture device to the other device with fewer resource constraints, thereby improving the performance of the image capture device.

Further to the above technical effect and benefit, in image capture devices that have resource constrained operating environments, shifting the stabilization processing requirements from the initial capture time to a later point enables more resources to be dedicated to the image capture components of the device at capture time, which often require a significant amount of resources, such as power. In addition, the device can simply stream the image data to an encoder and does not need to surface the data or convert the data between different formats while the image capture components are operating.

As another example technical effect and benefit, maintaining a separate motion track can enable the preservation of motion data for later use in the event that improved stabilization techniques are developed.

As another example technical effect and benefit, since the raw motion data (e.g., raw sensor data) may be specific to a particular device and/or sensor type, transforming the raw motion data into the homography matrices improves the consistency of the motion data and provides a standardized motion metric that enables universal handling. In addition, transforming the raw motion data into the homography matrices can improve user privacy.

As another example technical effect and benefit, in some implementations, the microvideo trimming techniques described herein do not require the full video to begin the trimming process. Instead, the microvideo generation system can operate on-the-fly. In particular, the system needs only the past, buffered frames and can start immediately after the user control input is received. As a result, the microvideo generation system can improve the speed of the computing process and generate the microvideos in a reduced time frame. As another related result, the microvideo generation system does not need a large buffer to buffer the full video but instead only the portion prior to the user control input. As such, the microvideo trimming techniques described herein reduce the memory requirements of the device.

As another example technical effect and benefit, in some implementations, the microvideo trimming techniques described herein use sensor and/or ISP data instead of performing analysis of the image itself. As a result, the trimming technique has relatively low computational complexity, thereby reducing the need for processing resources and improving the speed at which the technique is performed. In particular, the low computational complexity resulting from use of the sensor and/or ISP data enables the process to run much faster than methods which use image analysis. In fact, the complexity is sufficiently low that the system can achieve real-time performance.

As another example technical effect and benefit, in some implementations, the microvideo generation system trims differently for static shots versus panning shots. For example, the microvideo can keep more contents in panning cases and trim more tightly for static scene. The system can handle both panning cases and static scene cases and can perform a smooth operating transition between these two cases. Thus, the responsiveness of the image capture device to the context of the image capture can be improved. In addition, the system can drop microvideos which are too short after trimming or extend it to a minimum length.

As further examples, experimental testing of an example microvideo generation system provided the following example results: the trimmer cuts the microvideo average duration from 3 s to 2.4 s which saves 20% storage and power. In addition, overly short microvideos are dropped after trimming. The logging shows that the system dropped 33% of short microvideos after trimming, thereby saving 18% more storage space.

With reference now to the Figures, example embodiments of the present disclosure will be discussed in further detail.

FIG. 1 depicts a block diagram of an example image capture device 102 according to example embodiments of the present disclosure. The image capture device 102 can include an image sensor 120 and an image signal processor 122 that operate together to generate frames of imagery. The image sensor 120 can be operable to capture raw image data. The image signal processor 122 can process the raw image data to form an image frame. In some implementations, the image signal processor 122 can include a specialized digital signal processor.

In some implementations, the image signal processor 122 can include one or more hardware blocks that are operable to contribute to formation of the image frame. Example hardware blocks that can be included in the image signal processor 122 include a RAW filter block; a bad pixel correction block; a raw denoise block; a black level (flare) correction block; a lens shading correction block; a white balance block; a demosaicer block; a Bayer transformation block; a demosaicing block; a color correction block; a gamma correction block; a tone mapping block; and/or a color space convert block. The image signal processor 122 can also include various other components, blocks, and/or subsystems that contribute to formation of the image(s) based on raw image data captured by the image sensor 120.

The image sensor 120 and/or the image signal processor 122 can generate various information or statistics (including one or more hardware-generated statistics generated by the hardware blocks) based at least in part on, for example, the raw image data captured by the image sensor 120 or intermediate image data within the processor 122. In particular, according to an aspect of the present disclosure, these statistics are readily available with only a small amount of marginal energy expenditure and are thus very lightweight and computationally inexpensive. As examples, statistics can include auto exposure statistics, auto white balance statistics, auto focus statistics, thumbnails, color histograms, and/or high-frequency maps. Other near-free signals such as metadata, settings, OIS lens position, and/or sensor data can also be used in addition to and/or derived from the statistics.

The image capture device 102 can also include one or more sensors 128. As examples, the sensor(s) 128 can include one or more gyroscopes, accelerometers, magnetometers, inertial measurement units (IMUs), or other motion sensing sensors that provide sensor data indicative of motion of the image sensor 128 and/or the image capture device 102 as a whole. The sensors 128 can be electronic devices that measure and report one or more of a velocity, an orientation, and gravitational forces applied to or otherwise associated with the image capture device 102. In some implementations, data from the one or more sensors 128 or motion data derived therefrom (e.g., homography matrices) can be appended to an image captured around the time such data was generated by the sensors 128 (e.g., in a separate motion data track) or can be used to trim a microvideo, as will be discussed further below. Such information can also be usable by downstream processes, for example, in selecting (or rejecting) particular images due to blur, motion, or other undesirable attributes attributable to unintended movement, jostling, or other physical disturbance of the image capture device 102 (e.g., physical disturbance resultant from a user's gait). Thus, image capture timing can be based on data from sensors 128.

In some implementations, aspects of the present disclosure can also use near-free signals that are generated from sensors 128, the image sensor 120, and/or the image signal processor 122. In particular, typically these near-free signals such as hardware-generated statistics are generated anyways for the purposes of performing auto exposure, auto white balance, and/or auto focus at the image formation stage.

Example near-free signals that can be used by the image capture device 102 include metadata or settings that are freely available from the image capture parameters. Example metadata include processing pipe metadata and sensor metadata. Example settings include exposure time, analog gain, and digital gain. Additional near-free data includes sensor data such as inertial motion unit (IMU) signals (e.g., the angular velocity described by one or more IMUs).

Additional example hardware-generated statistics include thumbnails, color histograms, luma histograms, and/or high-frequency maps, which are readily available with only a small amount of marginal energy expenditure. Auto exposure, auto white balance, and/or auto focus statistics can include auto focus patch filter sums, auto white balance patch pixel sums, and the like.

The image capture device can further include a shutter controller 130. The shutter controller 130 can control when image data is collected, stored, and/or processed. For example, the shutter controller 130 can operate to control the image capture device 102 in response to user control input. For example, the user control input can include selection of a physical or virtual shutter control button.

According to an aspect of the present disclosure, the image capture device can further include a microvideo generation system 124 that generates microvideos. The microvideo generation system 124 can generate image files according to a novel microvideo image format described herein. For example, a microvideo can be a file that contains both a still image and a brief video. One example microvideo generation system 124 will be discussed in further detail with reference to FIG. 5. One example microvideo format is described with reference to FIGS. 2-4.

The microvideos generated by the microvideo generations system 124 can be stored at one or more storage devices 126. The storage devices 126 can include one or more of various different types of memory include volatile and/or non-volatile memory. Example storage devices 126 include RAM, ROM, EEPROM, EPROM, flash memory devices, magnetic disks, etc., and combinations thereof.

Figure 2:
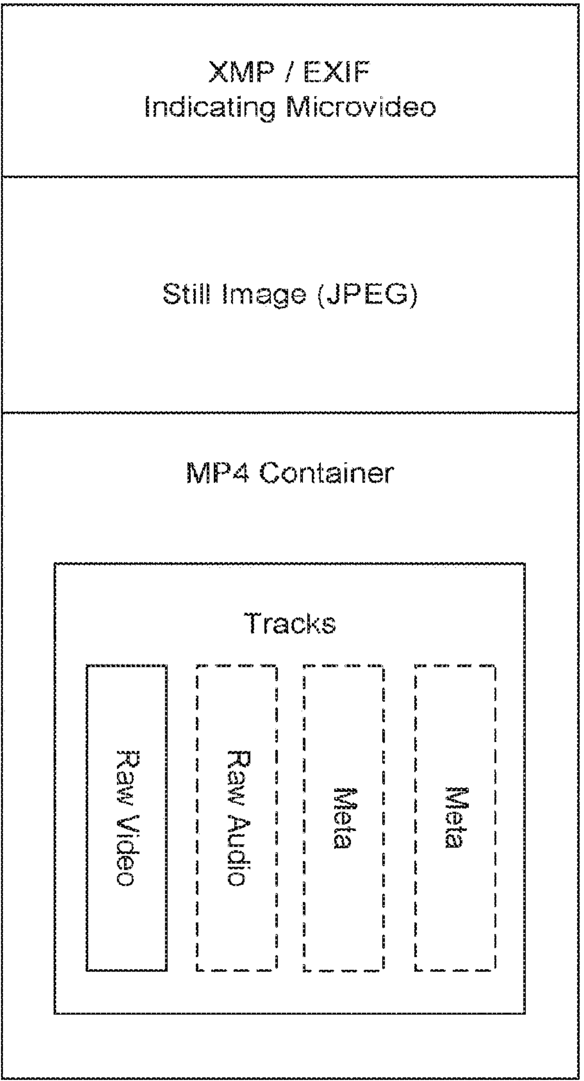
FIG. 2 depicts a block diagram of an example microvideo format according to example embodiments of the present disclosure.

FIG. 2 depicts a block diagram of an example microvideo format according to example embodiments of the present disclosure. In some implementations, the microvideo can have the following format <jpeg_bytes><mp4_bytes> with an extension of .jpg. In some implementations, the mp4 bytes can be directly appended to the end of the compressed jpeg. In some implementations, the XMP tags and file name format described below can be used.

In some implementations, the XMP tags can include some or all of the following example fields:

| Name | Type | Description |
|---|---|---|
| MicroVideo | Integer | A value of 0 can indicate that the file should not be treated as a microvideo. A value of 1 can indicate that the file should be treated as a microvideo. All other values may be undefined and can be treated equivalently to 0. Since XMP can be carried over by most well behaved editors, JPEGs may still have a non-zero positive value for this field even though the appended mp4 has been stripped. This field may not be definitive in some instances and clients can confirm that a video is present. If the value is zero or negative, then the file can be treated as a non-microvideo, even if a video is in fact appended to the file. |
| Micro-VideoVersion | Integer | This can indicate the file format version of the microvideo. |
| Micro-VideoOffset | Integer | This can indicate the offset in bytes from the end of the file to the point where the appended mp4 begins (which may in some instances be equivalent to the length of the compressed mp4). This field can be an optimization and may in some instances become invalid if the mp4 is stripped or if an edit is applied. Readers can attempt to find the end of the JPEG and check for an mp4 even if there is no mp4 at the offset specified here. Readers can identify an mp4 by skipping to the offset and checking for the mp4 header. |
| Micro-Video-Presentation-TimestampUs | Long | An integer that can represent the presentation timestamp (e.g., in microseconds) of the video frame corresponding to the image still. Value can be −1 to denote unset/unspecified |

In some implementations, microvideos can adhere to a specific file name format to be recognized by certain systems as a microvideo. For example, a photograph storage application can quickly identify microvideos and show the appropriate badging. In some instances, if the file name format does not match the specification, a client may not attempt to parse XMP from the file and can treat it as a simple JPEG. One example file name format can be as follows: MVIMG_[a-zA-Z0-9_]+. (JPGLipgIJPEGLipeg)

In some implementations, the microvideo can include a video track, and optionally an audio track. Optionally, the MPEG4 data can also include two additional metadata tracks specifying how playback of the video frames can be stabilized. For example, these metadata tracks can be mett tracks (e.g., with MPEG4 atom moov.trak.mdia.hdlr.handlerType="mett").

The track that provides transform information about how frames are rendered can have a MIME type of "application/microvideo-meta-stream". This can be specified via the TextMetaDataSampleEntry defined in section 12.3.3.2 of the ISOBMFF to signal the metadata's mime format. Each frame in this track can correspond to a video frame and can contain a serialized protocol buffer specified by the following example protobuf definition:

```
// Contains a metadata payload associated with microvideos that is stored per frame.
message Data {
    // For each frame, there are 12 homography matrices stored. Each matrix is
    // 3×3 (9 elements). This field will contain 12 × 3 × 3 float values. The
    // first row of the first homography matrix will be followed by the second row
    // of the first homography matrix, followed by third row of first homography
    // matrix, followed by the first row of the second homography matrix, etc.
    repeated float homography_data = 1;
    // The width of the frame at the time metadata was sampled.
    optional int32 frame_width = 3;
    // The height of the frame at the time metadata was sampled.
    optional int32 frame_height = 4;
    // Device timestamp (in microseconds) of this frame.
    optional int64 device_timestamp_us = 5;
    // Set to whether the timestamp corresponds to a key frame
    optional KeyFrameType is_key_frame = 6 [default=UNKNOWN];
    enum KeyFrameType {
      // Specifies that the value is unset. This can be used for nanoproto.
      UNKNOWN=0;
      // Specifies that the frame is not a key frame. NON_KEY_FRAME = 1;
      // Specifies that the frame is a key frame. KEY_FRAME = 2;
    }
}
```

Each homography matrix in Data.homography_data can represent a transform from the previous frame to the current frame. For a pixel (x1, y1) on the current frame, the matching pixel (x0, y0) on the previous frame can satisfy the homography transform $[x1, y1, 1]^T = H*[x0, y0, 1]^T$.

Figure 3:
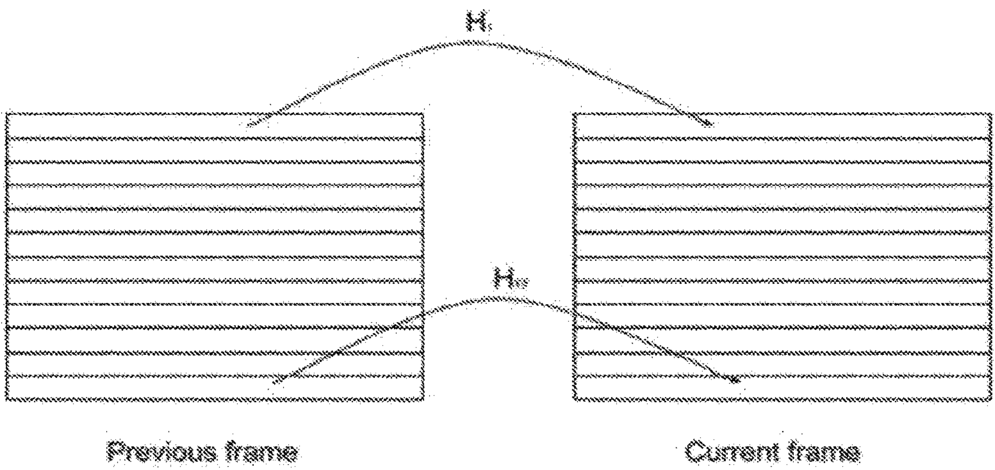
FIG. 3 depicts a graphical diagram of homography matrices between a pair of image frames according to example embodiments of the present disclosure.

In some implementations, each frame is divided into a number of portions. For example, the portions can be bands along the scanline direction. In one example, 12 bands are defined for each frame. Each portion (e.g., band) can have a homography transform. Thus, in the example implementation that uses 12 bands along the scanline direction, there are 12 homography matrices H1 to H12 as shown in FIG. 3. In particular, FIG. 3 depicts a graphical diagram of example homography matrices between a pair of image frames according to example embodiments of the present disclosure.

Figure 4:
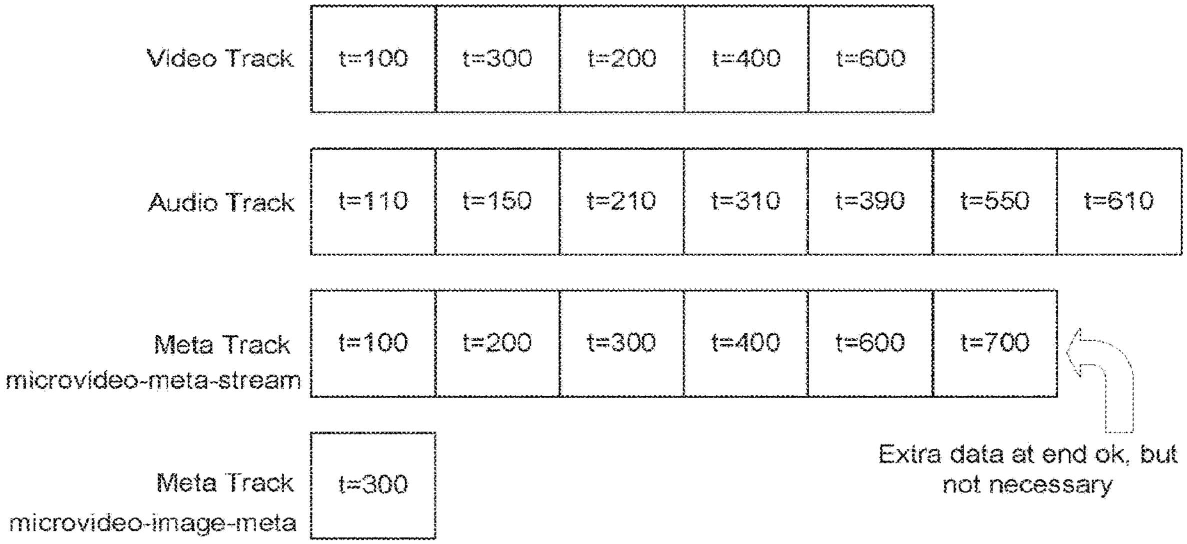
FIG. 4 depicts a graphical diagram of example file tracks according to example embodiments of the present disclosure.

FIG. 4 depicts a graphical diagram of example file tracks according to example embodiments of the present disclosure.

In some implementations, though the video track can have frames that are out-of-order (e.g., B-frames), the metadata track must be ordered and have timestamps in increasing order. For each timestamp in the video track, a frame with the same timestamp can exist in the metadata track.

In some implementations, there is an is_key_frame field in the proto to indicate whether the frame itself is a key frame or not. A key frame can also be known as an I-frame (or "intra frame"). This information can come from the encoder (e.g. if using MediaCodec for encoding. BufferInfo.flags can be set with BUFFER_FLAG_KEY_FRAME for key frames). This information can in some implementations be used to assist with trimming. For example, if trimming the initial frames is desired without transcoding, the cut can be constrained to occur on a key frame.

Another example metadata track can contain information about whether the video should be stabilized on the backend, and the timestamp of the frame where the video should start playback animation before looping back to the beginning and continuing with video looping. This track can have a mime type of "application/microvideo-image-meta", and can contain a single frame with a presentation timestamp corresponding to any of the video frames (e.g., the first video frame's timestamp). In some implementations, the only limitation is that the timestamp must have a value between the first and last video frame timestamp (inclusive). The frame data can contain a serialized protocol buffer, for example, as shown in the following example:

```
// Contains a metadata payload with information related to the microvideo image still.
message ImageData {
  // Device timestamp in microseconds of the frame closest to the image still.
  int64 photo_timestamp_us = 1;
  // Presentation timestamp (in microseconds) of the associated image still.
  // Note: this value can become invalid if the associated video has been
  // edited, trimmed, or truncated.
  optional int64 photo_presentation_time_us = 2;
  // Set to true if the associated video track should NOT be stabilized (e.g.
  // already stabilized, or stabilization is inappropriate).
  optional bool do_not_stabilize = 3 [default=false];
}
```

As one example, when the microvideo file is uploaded to a photograph application backend, it may undergo additional image stabilization. The do_not_stabilize field can allow the developer to specify that the video content should not undergo any additional stabilization treatment.

Figure 5:
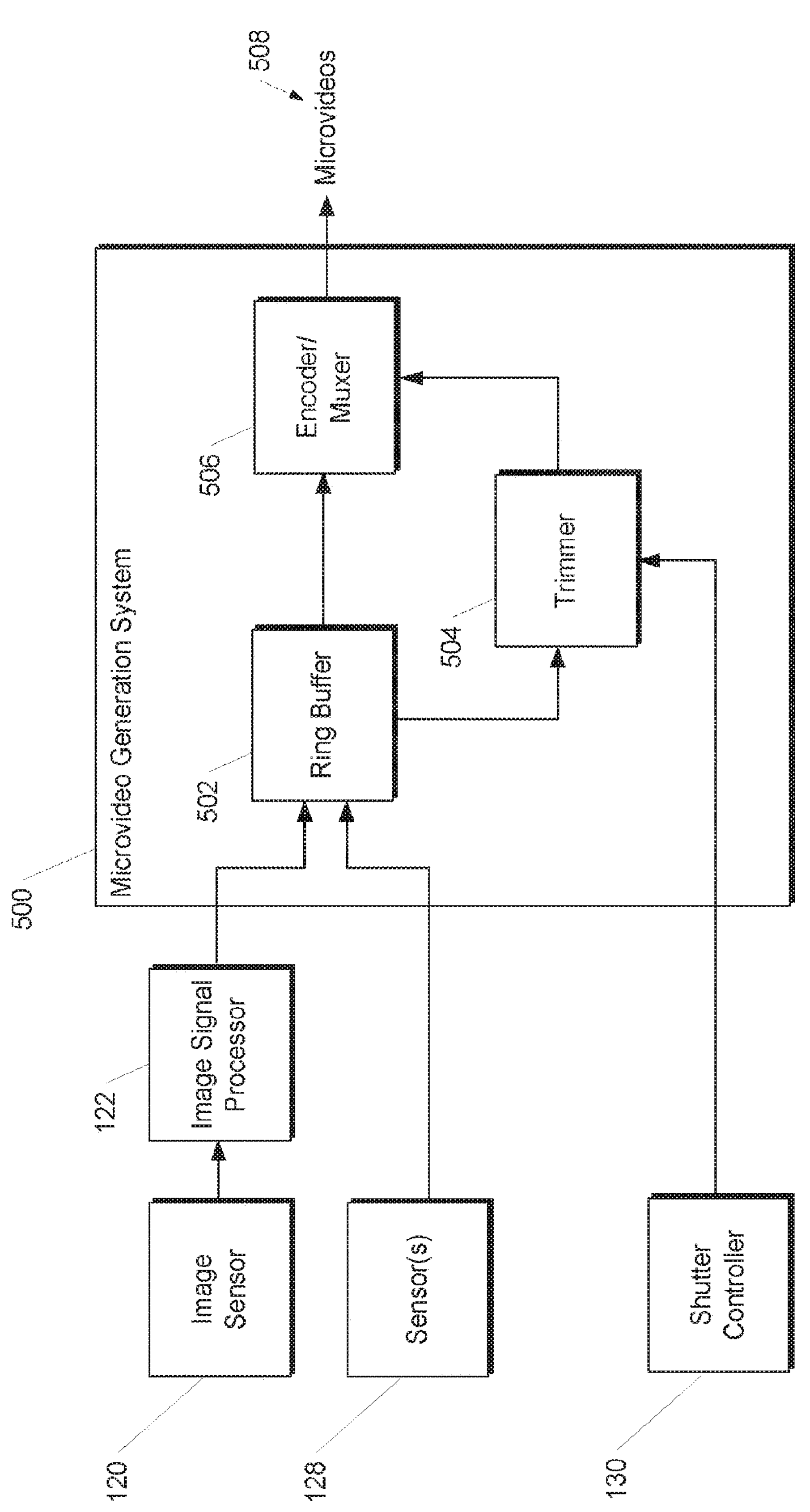
FIG. 5 depicts a block diagram of an example microvideo generation system according to example embodiments of the present disclosure.

FIG. 5 depicts a block diagram of an example microvideo generation system 500 according to example embodiments of the present disclosure. The microvideo generation system 500 can include a ring buffer 502, a trimmer 504, and an encoder 506. The microvideo generation system 500 can generate microvideos 508.

More particular, in some implementations, it can be assumed that the microvideo is captured at most M seconds before the shutter and at most N seconds after the shutter. In some implementations, as one example, M=1.5 and N=1.5. Other values can be used as well (e.g., 2 seconds, 3 seconds, etc.) M does not have to equal N. FIG. 5 is a high level diagram of the trimming method which, in some implementations, involves the following steps. The video frames and sensor/ISP data from the sensor 120, the processor 122, and the sensor(s) 128 can be fed into the ring buffer 502 first. The trimmer 504 can be triggered by the shutter controller 130 (e.g., in response to a shutter press). The trimmer 504 can determine the starting/ending frames of a microvideo and send their timestamps to the encoder/muxer 506 to create a microvideo 508 within this range.

In some implementations, the video frames and sensor/ISP data can be buffered for M seconds in the ring buffer 502 all the time during preview. The buffer 502 can include or be implemented in one or more of various different types of computer-readable storage, including for example. RAM.

Each time when the shutter controller 130 indicates that user control input (e.g., a shutter button press) was received, a current frame can be selected as a shutter frame, which can be denoted as F shutter.

Figures 6, 7:
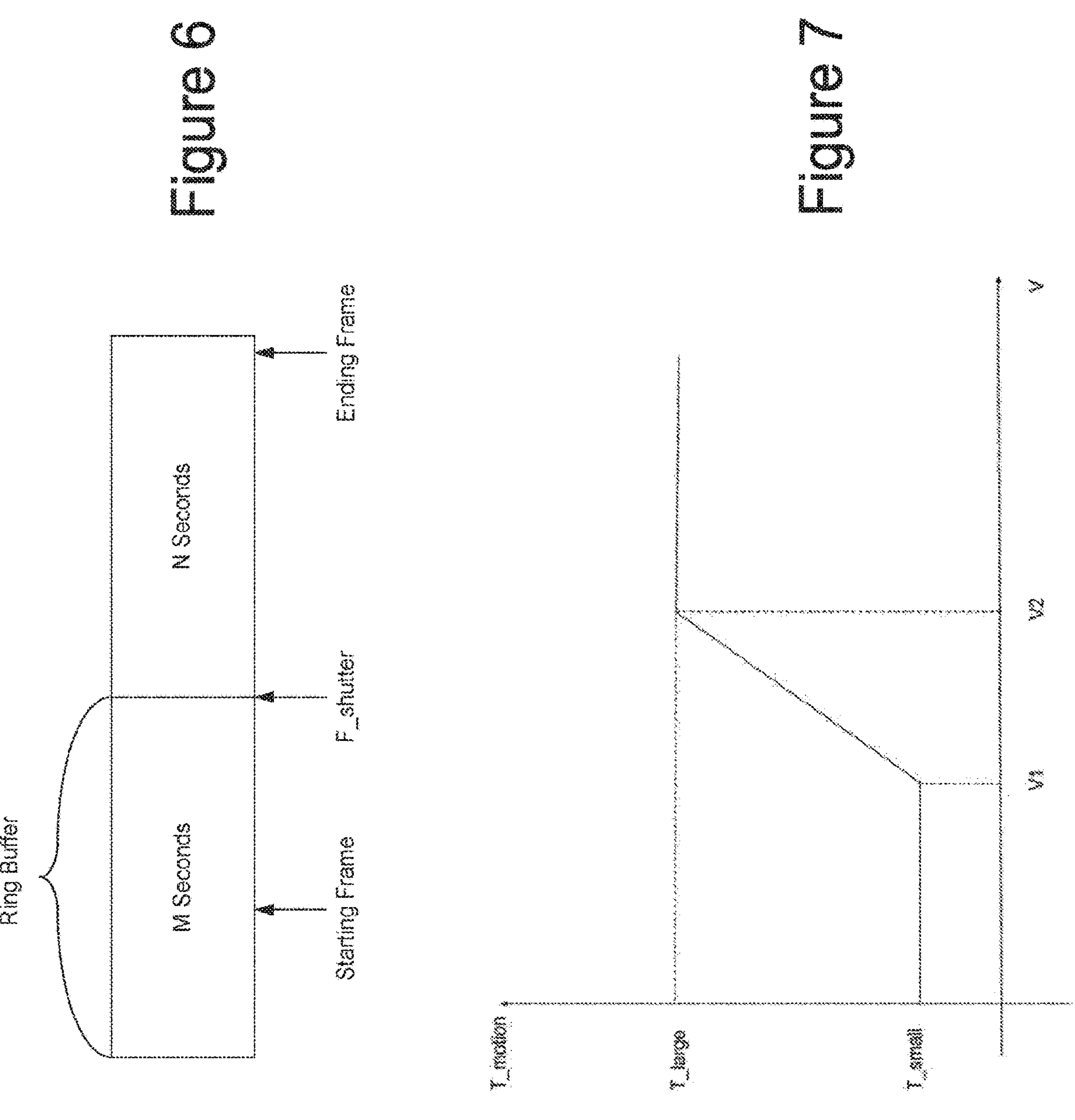
FIG. 6 depicts a graphical diagram of an example microvideo trimming process according to example embodiments of the present disclosure.
FIG. 7 depicts a graphical diagram of an example relationship between camera speed and motion threshold according to example embodiments of the present disclosure.

As shown in FIG. 6, all the frames and sensor/ISP data for M seconds before the shutter are already in the ring buffer so that they can be accessed (e.g., by the trimmer 504) immediately. All the frames and sensor/ISP data after the user control event are not available yet.

In some implementations, immediately after the shutter controller 130 indicates that user input was received, the microvideo generation system 500 can start a new instance of the trimmer 504 to determine the optimal starting frame. Multiple trimmers 504 can run at the same time (e.g., if the shutter button is clicked multiple times during a short period of time such as button mashing cases). The starting frame F_start should always be on or before the shutter frame (F_start<=F_shutter).

In some implementations, the trimmer 504 can move the current frame backwards from the shutter frame to look for the optimal starting frame for the microvideo 508. If the current frame, denoted as F_current, satisfies a certain number (e.g., one, two, all, etc.) of one or more criteria, it can be set as the starting frame. Three example criteria that can optionally be used are as follows.

Example Criterion 1: this criterion checks if the camera motion distance from the current frame to the shutter frame is larger than a threshold T_motion. This criterion can be used to trim off unwanted camera motion, such as pulling the phone out of pocket or putting it back. Both large translational motion or rotational motion would cause a large motion distance and thus got trimmed.

Example criterion 1 can be evaluated according to following: Max_i||(x_i(F_current), y_i(F_current))−(x_i (F_shutter), y_i(F_shutter))||>T_motion where ||.|| is the L2 distance. (x_i(F_shutter), y_i(F_shutter)), i=1 . . . 4, denotes the 4 corners of the shutter frame. They can be (0,0), (width-I, 0), (height-I, 0), (width-I, height-I). (x_i(F_current), y_i(F_current)), i=1 . . . 4, denotes the 4 corners of the current frame in the shutter frame's coordinate. They can be calculated by the transform between the current frame and the shutter frame which can be derived from the sensor data and ISP data.

In some implementations, the threshold T_motion can be determined adaptively based on the camera motion speed V near the shutter frame. The speed V can be computed from the camera motion distance described in the expression above divided by the time between the current and shutter frame. The speed can, in some implementations, be averaged for K frames which are the closest to the shutter frame. As one example, K=6.

In some implementations, the adaptive threshold T_motion can be a piecewise linear function of the camera motion speed Vas shown in FIG. 7. Thus, as one example, if V<V1, T_motion=T_small; if V>V2, T_motion=T_large; and if V1<V<V2, T_motion=T_small+(V−V1)*(T_large−T_small)/(V2−V1). This piecewise linear function can result in the following: If the camera motion speed is slow, it is likely a static shot and the threshold T_motion can be set to a small number. Since the threshold T_motion is small, the trimmer 504 will only keep frames which do not move much from the shutter frame to produce a good static microvideo. By contrast, if the camera motion speed is fast, it is likely a panning shot and the threshold T_motion can be set to a large number. Since the threshold T_motion is large, the trimmer will keep frames even the camera moved away a lot from the shutter frame to produce a good panning microvideo. There is also a smooth transition between these two cases.

The piecewise linear function is provided as one example only. Other relationships between camera motion speed V and the motion threshold T_motion can be used as well, including linear relationships, logarithmic relationships, and/or exponential relationships.

Example Criterion 2: this criterion checks if the total sensitivity change between the current frame and the shutter frame is larger than a threshold. This criterion can be used to remove sudden brightness changes in microvideos.

Example criterion 2 can be evaluated according to the following: abs(total_sensitivity_current−total_sensitivity_shutter)>T_total_sensitivity. The total sensitivity can be defined as total_sensitivity=sensor_sensitivity*exposure_time. Both sensor_sensitivity and exposure_time can be obtained from ISP data that can be retrieved directly from the camera hardware.

Example Criterion 3: this criterion checks if the camera zoom factor changes between the current frame and the shutter frame is larger than a threshold. This criterion can be used to remove the unwanted zooming in Microvideos.

Example criterion 3 can be evaluated according to the following: abs(zoom_current−zoom_shutter)>T_zoom.

Example Criterion 4: the one or more criteria can include a motion blur criterion that analyzes an amount of motion blur associated with the current frame. This motion blur criterion can be used to remove or otherwise start or end the microvideo at or adjacent to blurry frames that are caused by camera motion.

Example criterion 4 can be evaluated according to the following: motion_blur>T_motion_blur, where T_motion_blur is a motion blur threshold value. The motion_blur can be defined as: motion_blur=V_current*exposure_time, where V_current is the current speed of the camera motion of the current frame. The V_current can be derived, for example, from gyroscopic sensor data and/or ISP data.

Example Criterion 5: the one or more criteria can include a focus criterion that analyzes auto focus data associated with the current frame. This focus criterion can be used to remove or otherwise start or end the microvideo at or adjacent blurry frames that are caused by the lens being out-of-focus. The auto focus data for each frame can be obtained from the ISP. For example, the auto focus data can include an auto focus status. In some implementations, the criterion can be satisfied when the auto focus status for the current frame is "unfocused."

In some implementations, if the trimmer 504 reached the frame M seconds before the shutter frame without meeting the certain number or any of the one or more criteria, the starting frame can be set to the frame M seconds before the shutter frame, i.e., F_start=F shutter−M.

In some implementations, once the optimal starting frame is determined, the encoder 506 will start encoding the microvideo 508 from the starting frame. Then, the trimmer 504 needs to determine the optimal ending frame to stop the encoder 506.

In some implementations, for each new frame coming in after the shutter controller 130 indicates the user input, the trimmer 504 can check if the microvideo should end at this frame. The trimmer 504 can set the new frame as the current frame and use the same or similar process as is used to determine the starting frame. For example, the same or similar criteria can be used. If the same criteria is used, the same or different thresholds can be used. The certain number of criteria that must be met can be the same or different. If the current frame meets the certain number of the one or more criteria, the trimmer 504 can set the current frame as the ending frame.

In some implementations, if the trimmer 504 reaches the frame N seconds after the shutter frame without meeting the certain number or any of the criteria, the trimmer 504 can set this frame to be the ending frame, i.e., F_end=F_shutter+N.

In some implementations, once the ending frame is determined, the system 500 can stop the encoder 506 at the ending frame. The duration of the microvideo 508 will be from the starting frame to the ending frame, i.e., duration=F_end−F_start.

Users usually do not want to see very short microvideos since they look jarring. So the system 500 can check the microvideo duration against a minimum duration threshold T_minduration. As one example, T_minduration can be 1 second. If duration>=T_minduration, the system 500 can save out the microvideo 508. However, if duration<T_minduration, the system 500 can pursue a number of different options. In a first option, the microvideo can be canceled: No microvideo is saved and only the still photo is saved. In a second option, F_end can be set equal to F_start+T_minduration. The microvideo with T_minduration is then saved even though the trimming is not optimal. In a third option, frames can be added to the beginning and/or end until the T_minduration threshold is met. Users can be provided with controls to decide which option to use based their preference (no microvideo or a microvideo with non-optimal trimming).

Figure 8:
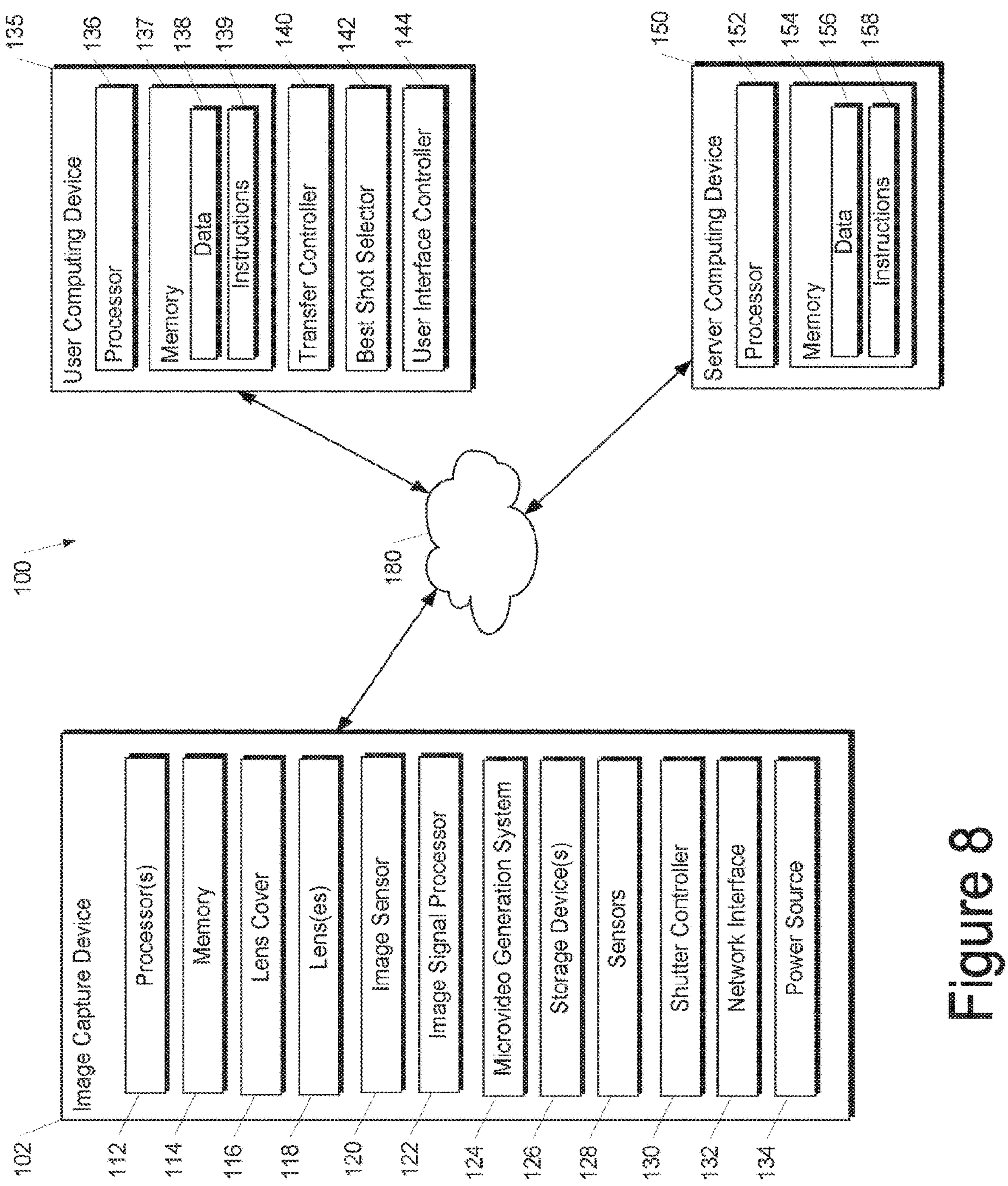
FIG. 8 depicts a block diagram of an example computing system according to example embodiments of the present disclosure.

FIG. 8 depicts an example image capture, curation, and editing system 100 according to an example embodiment of the present disclosure. The system 100 is provided as one example system only. The systems, methods, techniques, and principles of the present disclosure can be used in and applied to many different systems in addition or alternatively to the example system 100. For example, in some implementations, the image capture device 102 does not participate in a network 180 with the user computing device 135 and/or the server computing device 150.

The example system 100 includes at least one image capture device 102 and a user computing device 135. The image capture device 102 can, in some implementations, be mobile and/or able to be worn. For example, the image capture device 102 can be a smartphone, tablet, or other similar device. As another example, the image capture device 102 can be an embedded device and/or a smart device (e.g., smart appliances, smart speakers, home manager devices, assistant devices, security systems, and the like). The system 100 may also include one or more additional image capture devices and/or a server computing device 150.

The image capture device 102 includes one or more processors 112 and a memory 114. The one or more processors 112 can be any suitable processing device and can be one processor or a plurality of processors that are operatively connected. In some implementations, the processor 112 includes a dedicated vision processing platform that delivers high-performance machine vision and visual awareness in a power-constrained environment. For example, the processor 112 can be a system-on-a-chip (SoC) designed for high-performance, low-power computational imaging. In some implementations, the processor 112 includes hardware, software, and/or firmware that is selectively usable to perform a complete image processing pipeline on-chip. In some implementations, the processor 112 includes multiple vector processors optimized for vision processing workloads.

The memory 114 can include one or more non-transitory computer-readable mediums, such as RAM, ROM, EEPROM, EPROM, flash memory devices, magnetic disks, etc., and combinations thereof. In some example implementations, the memory 114 includes at least a first volatile (e.g., DRAM) memory and a second non-volatile memory. For example, the first volatile memory can be used for temporary storage of various types of image data, while the second non-volatile memory can be used for non-temporary storage of various types of image data. For example, the first volatile memory can include a temporary image buffer. In some implementations, the non-volatile memory includes a flash memory card. In some implementations, the flash memory card is a Secure Digital (SD) card.

The example image capture device 102 can also include a lens cover 116, one or more lenses 118, and an image sensor 120. The image sensor 120 can be a sensor that detects incoming light or other electromagnetic radiation and outputs data sufficient to generate an image of a scene. For example, the image sensor 120 can be a CMOS sensor or a CCD sensor. In some implementations, the one or more lenses 118 can include a wide angle lens such that images resulting from data output by the image sensor 120 are wide angle images.

As noted above, the image sensor 120 can output data sufficient to generate images of a scene viewed by the image sensor 120. The image capture device 102 can include various additional components for processing such data from the image sensor 120 to generate such images. As one example, the image capture device 102 can include an image signal processor 122. The image signal processor 122 can include one or more image processing components that are operable to process the raw data from the image sensor 120 to form image frames.

The image capture device 102 further includes a microvideo generation system 124, one or more storage devices 126, one or more sensors 128, and a shutter controller 130 as described with reference to FIG. 1.

The image capture device 102 further includes a network interface 132. The network interface 132 can include any number of components to provide networked communications (e.g., transceivers, antennas, controllers, cards, etc.). In some implementations, the image capture device 102 includes a first network interface operable to communicate using a short-range wireless protocol, such as, for example, Bluetooth and/or Bluetooth Low Energy, and also a second network interface operable to communicate using other wireless network protocols, such as, for example, Wi-Fi. In one example, the image capture devices are operable to communicate with each other using a short-range wireless protocol, such as Bluetooth Low Energy. Further, the image capture device 102 can be operable to communicate with the user computing device 135 using either the short-range wireless protocol (e.g., to transmit capture visualizations) or Wi-Fi or other more robust networking protocols (e.g., for the transfer of captured images).

The image capture device 102 can further include a power source 134. As one example, the power source 134 can be an on-board battery, such as an on-board lithium-ion battery. The image capture device 102 can also be electrically connectable (e.g., via a micro USB port or other electrical and/or data connection port) to a wall outlet or other source of utility power or other appropriately rated power. Plugging the image capture device 102 into a wall outlet can recharge the on-board battery. In some implementations, the image capture device 102 is configured to transfer images to the user computing device 135 over network 180 or perform other highly energy consumptive tasks only when the image capture device 102 is connected to an external power source, such as a wall outlet.

The system 100 can further include the user computing device 135 and the server computing device 150. In some implementations, the image capture device 102 communicatively connects to the user computing device 135 over a local area network portion of network 180, while the user computing device 135 communicatively connects to the server computing device 150 over a wide area network portion of the network 180. In other implementations, the image capture device 102 communicatively connects to the server computing device 150 directly over the wide area network.

In some implementations, the user computing device 135 can perform image curation and enable user editing of the images. In particular, in some implementations, when connected to the image capture device 102 (e.g., after a capture session has been completed), the user computing device 135 can select certain of the images stored at the image capture device for transfer to the user computing device 135. The user computing device 135 can also provide a user interface that enables the user to selectively edit the transferred images. In particular, the user interface can enable various advanced image editing techniques such as computational photography, camera repositioning, etc.

User computing device 135 can be, for example, a computing device having a processor 136 and a memory 137, such as a wireless mobile device, a personal digital assistant (PDA), smartphone, tablet, laptop, desktop computer, computing-enabled watch, computing-enabled eyeglasses, or other such devices/systems. In short, user computing device 135 can be any computer, device, or system that can interact with the image capture device 102 and (e.g., by sending and receiving data) to implement the present disclosure.

Processor 136 of user computing device 135 can be any suitable processing device and can be one processor or a plurality of processors that are operatively connected. Memory 137 can include any number of computer-readable instructions 139 or other stored data 138. In particular, the instructions 139 stored in memory 137 can include one or more applications. When implemented by processor 136, the one or more applications can respectively cause or instruct processor 136 to perform operations consistent with the present disclosure, such as, for example, executing an image storage, curation, editing, and sharing application. Memory 137 can also store any number of images captured by the image capture device 102 and/or the user computing device 135.

User computing device 135 can further include a display. The display can be any one of many different technologies for displaying information to a user, including touch-sensitive display technologies.

In some implementations, the user computing device 135 also includes a transfer controller 140. In particular, in some implementations, when connected to the image capture device 102 (e.g., after a capture session has been completed), the transfer controller 140 can select certain of the images stored at the image capture device 102 for transfer to the user computing device 135. For example, such selection can be guided by various image attributes as reflected in various metadata annotations provided by the image capture device 102 respectively for the stored images.

In some implementations, the transfer controller 140 can perform an optimization algorithm to select which of the images stored in the memory 114 of the image capture device 102 to request for transfer. The optimization algorithm can have a plurality of associated objectives which include, for example, at least a diversity of settings and a diversity of depicted persons, while still requesting transfer of the most desirable images. In some implementations, the transfer controller 140 can implement a submodular function to select which images to request for transfer. In some implementations, the transfer controller 140 can consider one or more metrics generated for an image from hardware-generated statistics.

In some implementations, the user computing device 135 further includes a best shot selector 142. The best shot selector 142 can be implemented to select at least one highlight image from a group of images (e.g., at least one highlight image for each moment within a reflection). For example, the best shot selector 142 can select the highlight images based on the annotations or other metadata included for each of the images. In some implementations, the best shot selector 142 normalizes each image in a microvideo relative to its peer images within such microvideo prior to performing highlight selection. Thus, selection of a highlight image for each microvideo can be based at least in part on a comparison of the annotations of each image included in such moment relative to the annotations of at least one other image included in such moment. In some implementations, the best shot selector 142 can consider one or more metrics generated for an image from hardware-generated statistics.

The user computing device 135 also includes a user interface controller 144. The user interface controller 144 can be implemented to provide a user interface that enables the user to temporally and/or spatially explore images within a reflection. In particular, the user interface controller 144 can be implemented to detect and respond to certain user input with appropriate user interface interactions.

Each of the transfer controller 140, the best shot selector 142, and the user interface controller 144 can include computer logic utilized to provide desired functionality. Thus, each of the transfer controller 140, the best shot selector 142, and the user interface controller 144 can be implemented in hardware, firmware and/or software controlling a general purpose processor. In some implementations, each of the transfer controller 140, the best shot selector 142, and the user interface controller 144 includes program code files stored on the storage device, loaded into memory 137 and executed by processor 136 or can be provided from computer program products, for example, computer executable instructions 139 that are stored in a tangible computer-readable storage medium such as, for example, a RAM disk or card or other computer-readable optical or magnetic media.

Server computing device 150 can be implemented using one or more server computing devices and can include a processor 152 and a memory 154. In the instance that server computing device 150 consists of multiple server devices, such server devices can operate according to any computing architecture, including a parallel computing architecture, a distributed computing architecture, or combinations thereof.

Processor 152 can be any suitable processing device and can be one processor or a plurality of processors which are operatively connected. Memory 154 can store instructions 158 that cause processor 152 to perform operations to implement the present disclosure.

Network 180 can be any type of communications network, such as a local area network (e.g., intranet), wide area network (e.g., Internet), or some combination thereof and can include any number of wired or wireless links. In general, communication between the server computing device 150 and the user computing device 135 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with user computing device 135 over network 180 by sending and receiving data.

Further, any of the processes, operations, programs, applications, or instructions described as being stored at or performed by the server computing device 150 can instead be stored at or performed by the user computing device 135 in whole or in part, and vice versa. In particular, in some implementations, the image capture device 102 can directly communicatively connect to the server computing device 150 and the server computing device 150 can perform the image curation, editing, storage, and sharing functions attributed to the user computing device 135 elsewhere in the present disclosure (e.g., via a web application). Likewise, any of the processes, operations, programs, applications, or instructions described as being stored at or performed by the image capture device 102 can instead be stored at or performed by the user computing device 135 in whole or in part, and vice versa. For example, in some implementations, the transfer controller 140 can be located at the image capture device 102 rather than the user computing device 135.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Any action, operation, component, method, technique, or other aspect described herein as being included in or performed by an image capture device can also be included in or performed by a device or system that does not capture images but instead simply processes images or makes decisions on the basis of images.

Although the figures depict steps or processes performed in a particular order for purposes of illustration and discussion, the methods of the present disclosure are not limited to the particularly illustrated order or arrangement. The various steps of the methods described herein can be omitted, rearranged, combined, and/or adapted in various ways without deviating from the scope of the present disclosure.

Each of the microvideo generation system 124, shutter controller 130, trimmer 504, and encoder 506 can include computer logic utilized to provide desired functionality. Each of the microvideo generation system 124, shutter controller 130, trimmer 504, and encoder 506 can be implemented in hardware, firmware, and/or software controlling a general purpose processor. For example, in some implementations, each of the microvideo generation system 124, shutter controller 130, trimmer 504, and encoder 506 includes program files stored on a storage device, loaded into a memory and executed by one or more processors. In other implementations, each of the microvideo generation system 124, shutter controller 130, trimmer 504, and encoder 506 includes one or more sets of computer-executable instructions that are stored in a tangible computer-readable storage medium such as RAM hard disk or optical or magnetic media.

What is claimed is:

1. An image capture device, comprising:

an image sensor configured to capture raw image data;

an image signal processor configured to process the raw image data to form a plurality of image frames; and one or more processors to implement a microvideo generation system which is configured to:

perform a trimming operation relating to the plurality of image frames according to one or more image criteria, and generate, based on the trimming operation, a microvideo comprising a still image and a video in a same data file.

2. The image capture device of claim 1, wherein the microvideo generation system is configured to, when a duration of the microvideo is less than a minimum duration threshold, store the still image and delete the microvideo.

3. The image capture device of claim 1, wherein the microvideo generation system is configured to, when a duration of the microvideo is less than a minimum duration threshold, add image frames to at least one of a beginning of the microvideo or an end of the microvideo until the duration of the microvideo is greater than or equal to the minimum duration threshold.

4. The image capture device of claim 1, wherein the image sensor is configured to capture further raw image data;

the image signal processor is configured to process the further raw image data to form a further plurality of image frames; and the microvideo generation system is configured to:

perform a further trimming operation relating to the further plurality of image frames according to the one or more image criteria, and generate, based on the further trimming operation, a further microvideo comprising another still image and a further video in a same further data file, wherein the microvideo generation system is configured to generate the further microvideo in parallel with generating the microvideo.

5. The image capture device of claim 4, wherein the microvideo and the further microvideo have different durations.

6. The image capture device of claim 4, wherein the microvideo and the further microvideo have different content from each other.

7. The image capture device of claim 4, wherein the further microvideo is generated in parallel with generating the microvideo in response to the image capture device receiving a user control input to capture an image more than a threshold number of times within a predetermined time period.

8. The image capture device of claim 1, wherein the still image is displayable at a same or higher resolution than image frames which form the video.

9. The image capture device of claim 1, wherein the microvideo generation system is configured to perform the trimming operation relating to the plurality of image frames according to one or more image criteria by:

identifying a start frame from among a shutter frame or one or more image frames occurring before the shutter frame, from among the plurality of image frames, and identifying an end frame corresponding to an image frame occurring after the shutter frame, from among the plurality of image frames, and the microvideo extends from the start frame to the end frame.

10. The image capture device of claim 9, wherein the microvideo generation system is configured to identify the start frame according to the one or more image criteria, and the one or more image criteria includes first motion information associated with the start frame and second motion information associated with the shutter frame.

11. The image capture device of claim 10, wherein the microvideo generation system is configured to compare a difference between the first motion information and the second motion information with a threshold motion value to identify the start frame.

12. The image capture device of claim 11, wherein the threshold motion value adaptively changes based on a speed of the image capture device indicated by the first motion information associated with the start frame and the second motion information associated with the shutter frame.

13. The image capture device of claim 9, wherein the microvideo generation system is configured to identify the start frame according to the one or more image criteria, and the one or more image criteria includes first total sensitivity information associated with the start frame and second total sensitivity information associated with the shutter frame.

14. The image capture device of claim 13, wherein the microvideo generation system is configured to determine the first total sensitivity information based on sensor sensitivity information and exposure time information associated with the start frame.

15. The image capture device of claim 9, wherein the microvideo generation system is configured to identify the start frame according to the one or more image criteria, and the one or more image criteria includes first zoom information associated with the start frame and second zoom information associated with the shutter frame.

16. The image capture device of claim 9, wherein the microvideo generation system is configured to identify the start frame according to the one or more image criteria, and the one or more image criteria includes focus information associated with the start frame indicating whether the start frame is out of focus.

17. The image capture device of claim 9, wherein the microvideo generation system is configured to identify the start frame according to the one or more image criteria and to identify the end frame according to the one or more image criteria.

18. The image capture device of claim 17, wherein the microvideo generation system is configured to identify the end frame as an image frame which occurs at a predetermined duration of time after the shutter frame, when the one or more image criteria are not satisfied with respect to the one or more image frames occurring after the shutter frame and within the predetermined duration of time after the shutter frame.

19. A computer-implemented method, the method comprising:

processing, by a computing system comprising one or more processors, raw image data captured by an image sensor to form a plurality of image frames;

performing, by the computing system, a trimming operation relating to the plurality of image frames according to one or more image criteria; and generating, based on the trimming operation, a microvideo comprising a still image and a video in a same data file.

20. One or more non-transitory computer-readable media that store instructions that, when executed by one or more processors of a computing system, cause the computing system to perform operations comprising:

processing raw image data captured by an image sensor to form a plurality of image frames;

performing a trimming operation relating to the plurality of image frames according to one or more image criteria; and generating, based on the trimming operation, a microvideo comprising a still image and a video in a same data file.

* * * * *